UNITED STATES PATENT OFFICE.

GURDON CONKLING, OF GLENS FALLS, NEW YORK.

COMPOUND FOR PREPARING IRON ORE FOR FURNACE USE.

SPECIFICATION forming part of Letters Patent No. 464,815, dated December 8, 1891.

Application filed March 26, 1891. Serial No. 386,513. (No specimens.)

*To all whom it may concern:*

Be it known that I, GURDON CONKLING, a citizen of the United States, residing at Glens Falls, in the county of Warren and State of New York, have invented new and useful Improvements in a Compound for Preparing Iron Ore for Furnace Use, of which the following is a specification.

This invention relates to a composition of matter which consists of finely-comminuted iron ore, magnesium chloride, magnesium oxide, calcium oxide, sodium silicate, and water.

In preparing my composition of matter I take about twenty parts, by weight, of an aqueous solution of magnesium chloride of about 35° Baumé, twenty-four parts of magnesium oxide, twelve parts of calcium oxide, and one part of an aqueous solution of sodium silicate. These ingredients I mix intimately together, and while the mixture thus formed is still in a fluid condition I add thereto a quantity of comminuted iron ore in the proportion of about two to three per cent. of the mixture and ninety-eight to ninety-seven per cent. of comminuted iron ore. By stirring these ingredients together a plastic mass is obtained which can be readily formed or molded into lumps of convenient form or size for handling and for furnace use. These lumps, when left to stand for a few days, become hard like stone, and in this state they can be readily transported and introduced into a furnace.

It must be remarked that all the ingredients in preparing the compacting mixture are fluxes, and that the quantity of the compacting mixture required is very small as compared with the quantity of comminuted iron ore to be compacted, so that the increase in the cost of transportation and of handling is trifling. Furthermore, the lumps prepared as above described are not liable to crumble into fine particles when they are introduced into a blast-furnace, so that the finely-comminuted iron ore is not liable to be blown out into the flues.

What I claim as new, and desire to secure by Letters Patent, is—

A new composition of matter consisting of comminuted iron ore, magnesium chloride, magnesium oxide, calcium oxide, sodium silicate, and water, mixed together in about the proportions herein described.

In testimony whereof I have hereunto set my hand in the presence of two subscribing witnesses.

GURDON CONKLING.

Witnesses:
WM. C. HAUFF,
E. F. KASTENHUBER.